(No Model.)
W. R. ZEIGLER.
CAR BRAKE.
No. 409,266. Patented Aug. 20, 1889.
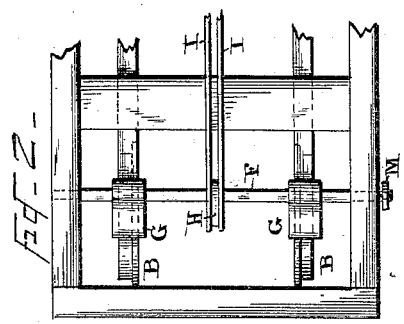
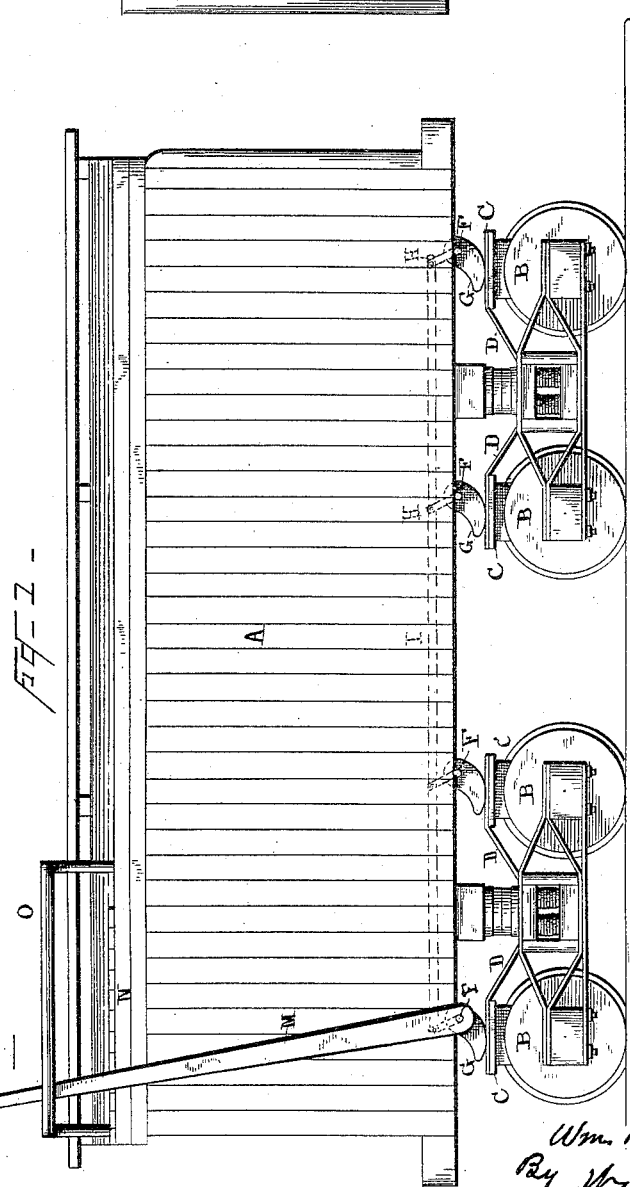
WITNESSES
Norris A. Clark
F. W. Johnson.
INVENTOR
Wm. R. Zeigler
By W. H. Bartlett
Atty.

UNITED STATES PATENT OFFICE.

WILLIAM R. ZEIGLER, OF WAVERLY, NEW YORK, ASSIGNOR OF ONE-HALF TO MILES S. HOADLEY, OF SAME PLACE.

CAR-BRAKE.

SPECIFICATION forming part of Letters Patent No. 409,266, dated August 20, 1889.

Application filed May 11, 1889. Serial No. 310,467. (No model.)

*To all whom it may concern:*

Be it known that I, WILLIAM R. ZEIGLER, residing at Waverly, in the county of Tioga and State of New York, have invented certain new and useful Improvements in Car-Brakes, of which the following is a specification, reference being had therein to the accompanying drawings.

This invention relates to brakes for railway-cars, and is specially applicable to hand-brakes for freight-cars, although it may be used on passenger or other cars.

The object of the invention is to produce a brake which can be applied by hand to all the wheels of a car, and in which the brake mechanisms of the several wheels are practically independent, so that should the brake-shoe from any wheel be lost or broken on any number less than the whole number the remaining brakes will not be impeded in operation.

In the drawings, Figure 1 is a side elevation of a freight-car having brakes according to my invention. Fig. 2 is a plan of truck, showing position of rock-shaft, cams, and brake-shoes.

A indicates a car-body, and B B the wheels, connected to the car-trucks in usual manner, C C are brake-shoes supported over the tops of the wheel-treads by leaf-springs D D, which tend to lift the shoes clear of the wheels. The springs D are attached to the bolster or other part of the truck, so that the brake-shoes always maintain their position over the wheel-tread, no matter what the movement of the truck may be.

A rock-shaft F extends across the car-frame above each pair of the brake-shoes, and parallel with the axles when the trucks are running straight. These rock-shafts are mounted in suitable bearings in the frame.

Each rock-shaft F has a pair of cam-shaped arms or eccentrics G, one eccentric over each brake-shoe. The eccentrics should be broad enough to extend over the brake-shoes, even if the car be running on a curve, so that the brake-shoe be canted with relation to its cam G. The rock-shafts F are preferably polygonal, save at the bearings, and the cams have corresponding holes to fit over the rock-shafts and are firmly keyed to said shafts.

Each rock-shaft F has an arm H, extending upward by preference, and all the arms H are connected together either by a bar I, pivoted to all the arms, or by chains, or in other suitable manner, a rigid connection being preferable.

One of the rock-shafts F extends at one side of the car, as at E, and a lever M is firmly secured to the projecting end of this shaft. Lever M extends upward above the top of the car, and a ratchet-plate N on the side of the car near the top serves to hold the lever in any set position. A bar O extends outside lever M, and also extends above the top of the car, serving as a guard to prevent the brakeman from falling from the car.

Supposing the brake-shoes to be a little above the top of the car-wheels and the cams G to be just a little above or resting on the brake-shoes, the operation of setting the brakes is as follows: The lever M is thrown by the brakeman in the direction of the arrow, and will be held by ratchet N in its forward position. This rocks all the rock-shafts F by means of the connections H I, and turns all the cams G down onto their respective brake-shoes C C, pressing the shoes down upon the wheels with great force. As the leverage by means of lever M is great, the whole weight of the car-body can be applied to the brakes, if necessary. This will seldom be found advisable, as the brakes can be applied with sufficient force to control the car with a moderate pressure on the lever M.

Should any cam or brake-shoe be lost or broken, the operation of the others is not affected, and should the connection I be broken the direct connection of lever M with one rock-shaft at E still gives a powerful hold on a pair of wheels, which will generally be sufficient to hold the car.

There is a great advantage in having the cams G hung on rock-shafts, instead of being pivoted to the frame of the car, as this causes the cams to move together, and also permits the engagement of the cams with the brake-shoe when the truck is on a curve without excessive width of cam-surface.

What I claim, and desire to secure by Letters Patent, is—

1. A car-brake consisting, essentially, of a pivoted truck having axles and wheels of usual character, and brake-shoes yieldingly supported on the truck above the car-wheels, a rock-shaft extending across the car-body above the shoes, cams on this rock-shaft in position to be rocked down upon the shoes however the truck may swing within its limit of movement, and a lever firmly connected to the rock-shaft, all combined substantially as described.

2. The combination, in a car-brake, of a brake-shoe yieldingly held above each wheel, a rock-shaft over each axle having a cam over each brake-shoe in position to rock onto the shoe, an arm on each rock-shaft and bars connecting all the arms, and a lever firmly connected to one of the rock-shafts at the side of the car and extending upward to a ratchet with which it may engage, all combined and relatively arranged substantially as described.

3. The combination, with a freight-car, of a rock-shaft extending across the car-body and bearing cams in position above the brake-shoes, a lever extending up at the side of the car and above the top, a ratchet at the top of the car to hold the lever, and a guard-bar outside the lever and above the car-top to protect the lever and the operator, all substantially as described.

In testimony whereof I affix my signature in presence of two witnesses.

WILLIAM R. ZEIGLER.

Witnesses:
PHILIP F. LARNER,
W. A. BARTLETT.